W. L. MERRILL.
WELDING APPARATUS.
APPLICATION FILED JAN. 31, 1919.
1,310,127.
Patented July 15, 1919.
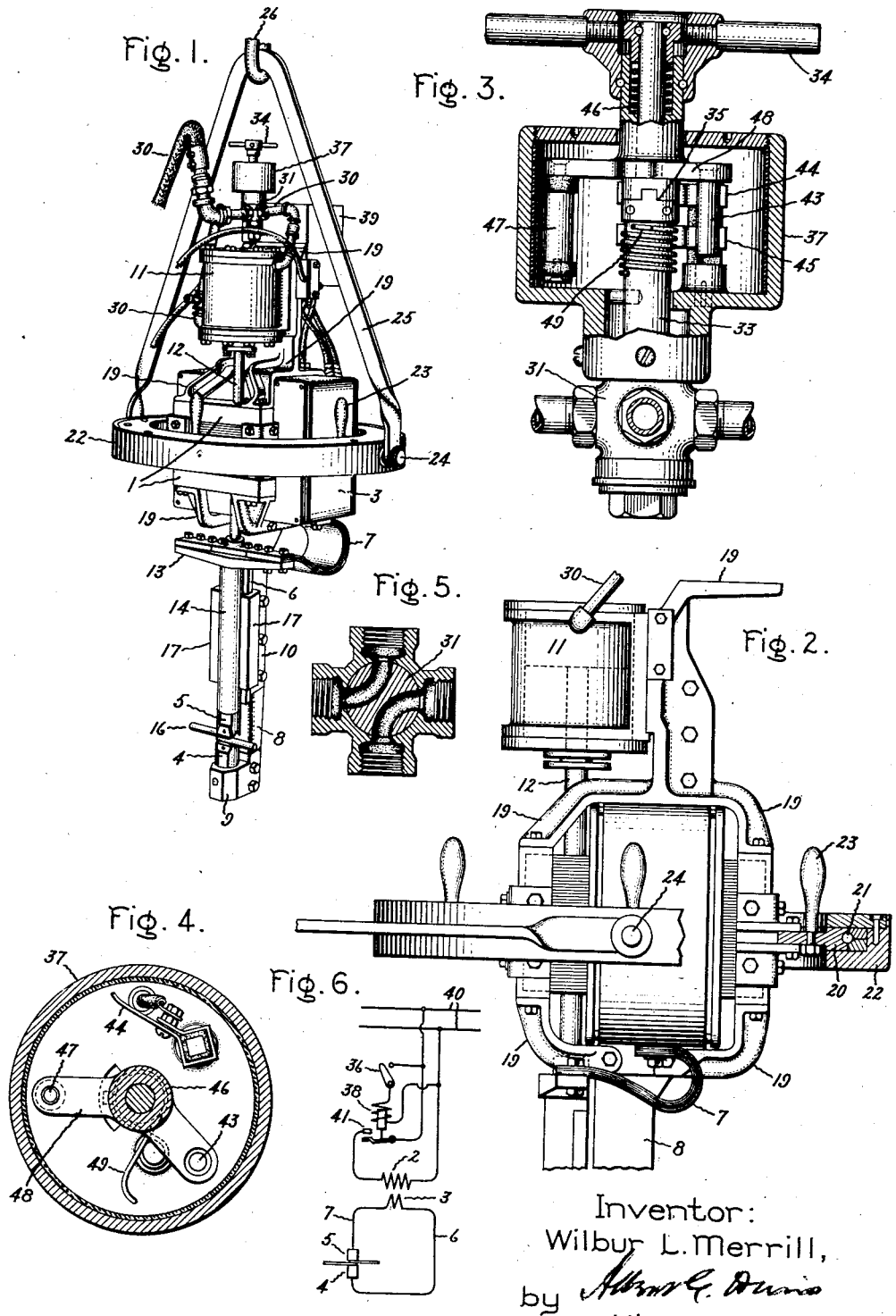
Inventor:
Wilbur L. Merrill,
by *Albert G. Davis*
His Attorney.

UNITED STATES PATENT OFFICE.

WILBUR L. MERRILL, OF SCHENECTADY, NEW YORK, ASSIGNOR TO GENERAL ELECTRIC COMPANY, A CORPORATION OF NEW YORK.

WELDING APPARATUS.

1,310,127.      Specification of Letters Patent.      Patented July 15, 1919.

Application filed January 31, 1919. Serial No. 274,309.

*To all whom it may concern:*

Be it known that I, WILBUR L. MERRILL, a citizen of the United States, residing at Schenectady, in the county of Schenectady, State of New York, have invented certain new and useful Improvements in Welding Apparatus, of which the following is a specification.

The present invention relates to electric resistance welding. One of the main objects of this invention is to provide a welding machine which may readily be turned in its angular relation to the work to produce welds in different planes. Another object of my invention is to provide a portable machine having a relatively long reach to enable welds to be made in otherwise inaccessible places. The novel features of my invention relate mainly to mechanical construction and disposition of the parts of the welding apparatus, and will be set forth with greater particularity in the appended claims, and described in detail in the following specification taken in connection with the accompanying drawings.

In the drawings, Figure 1 is a perspective view of a welding machine embodying my invention; Fig. 2 is a perspective view partly in section illustrating a preferred mount for the transformer and attached parts; Fig. 3 is a vertical section of a combined valve and switch used in my apparatus; Fig. 4 is a horizontal section of the switch; Fig. 5 is a horizontal section taken through a fluid-control valve, and Fig. 6 is a diagram of electrical connections.

Referring to Figs. 1 and 2, the welding current is supplied by a transformer consisting as usual of a core 1, a primary winding 2 (shown diagrammatically only, Fig. 6) and a secondray winding 3. The latter is electrically connected to the welding electrodes 4, 5, by electrical conductors 6, 7.

Running through the core of the transformer rigidly connected thereto, is a bar 8 constituting a frame and, consisting of steel, or other suitable metal, this frame extending at one end beyond the apparatus to give a desired welding reach. Mounted on the bar 8 remote from the welding transformer is a horn 9 upon which a welding electrode 4 is mounted. In order to increase the electrical conductivity of the bar 6, a set of copper conductors 10 are preferably attached to the same, for example, by means of bolts, and electrically connected to the welding electrode 5.

Upon the side of the transformer opposite the electrodes, a fluid pressure motor 11 is bolted to the frame 8. The movable element of the motor is connected to a reciprocating rod 12, passing through the core of the transformer. Mounted upon the rod 12 is a yoke 13 and a plunger 14 carrying the electrode 5, electrical connection to the flexible conductor 7 being made, as indicated. The reciprocations of the plunger 14 cause the electrodes 4, 5 to engage with the work 16, illustrated in the drawing as consisting of two round rods being lap-welded together. By suitably varying the configuration of the working faces of the electrodes flat or angular work may be welded, as desired. The movement of the plunger 14 is directed by suitable guides 17 mounted upon and suitably insulated from the frame 8.

Bolted to the core 1 of the transformer and to the bar 8 are brackets 19 which are in turn bolted to a circular runner or bearing 20 revolving upon ball bearings 21 within a circular carrier 22. Handles 23 bolted to the bearing 20 enable the welding machine to be rotated upon its axis within the carrier 22. The carrier 22 is in turn rotatably mounted by pins 24 upon a bail 25, which can be carried by a chain, cable, or other desired suspension 26, for carrying the welding machine about from place to place The reciprocating motor 11 preferably is pneumatically driven, compressed air being furnished through piping 30 containing a valve 31, which may be of the usual well known construction, a suitable form of air valve being shown in Fig. 5. The construction and valve control of pneumatic pistons being well known will not be described herein.

The valve 31 is connected to a valve stem 33, which may be moved by a handle 34 disengageably connected to the valve stem 33 by a clutch 35. An electric switch, diagrammatically indicated as switch 36 in Fig. 6, is contained within a housing 37 above the air control valve, and one element of the switch is connected to the handle 34. The closure of the switch 36 energizes a contactor magnet 38 contained within a box 39 mounted upon a projection of the bracket 19, (Figs. 1 and 2) and energized by connection to the supply circuit 40. The movement of the armature of the contactor 38 opens and closes a contact 41 in supply circuit 40 and controls the secondary welding current. The switch element connected to the handle 34 is a cylinder 47, (shown in Fig. 3) which may be moved to complete a circuit between plates 44, 45, and thereby closes the circuit of the contactor magnet 38.

When it is desired to make a weld and the electrodes 4 and 5 are in position to engage with the work, the valve 31 is turned to admit air upon that side of the movable element of the reciprocating motor 11, which will cause the plunger 14 to carry the electrode 5 toward the electrode 4. When a desired pressure has been exerted upon the work the handle 34 is pulled outwardly against the spring 46 to disengage the clutch 35. The handle is then turned to carry the switch cylinder 47 toward the terminals 44, 45. Before the cylinder 47 approaches these terminals, the cylinder 43 connected in common with the cylinder 47 with the bridge plate 48, engages the spring 49, and as the rotation of the handle 34 is continued to make electrical contact, tension is exerted upon the spring 49. When finally the handle 34 has been turned sufficiently to complete the electrical circuit and the contact 41 has been closed by contactor 38, energizing the transformer, welding current is passed through the work between the electrodes 4 and 5. When the weld is completed the handle 34 is released and the tension of the spring 49 snaps the contact pin 47 away from the terminals 44, 45, opening the circuit of contactor magnet 38, and interrupting the welding current. The clutch 35 may then be again brought into engagement and further rotation of the handle will bring the ports of the valve 31 into such a relation as to cause the reciprocating motor 11 to draw the plunger 14 away from the work. By the described construction the engagement of the welding electrodes with the work and the flow of welding current takes place in a predetermined sequence.

Although the described welding apparatus is of general utility for resistance welding, it is in particular adapted for welding the intersections of heavy mesh construction, as, for example, heavy concrete reinforcements.

What I claim as new and desire to secure by Letters Patent of the United States, is:—

1. An electric welding apparatus comprising a transformer, coöperating welding electrodes, a motor device for moving said electrodes in and out of engagement with work to be welded, a frame connecting said transformer, welding electrodes, and motor device to form a unitary structure, and a carrier rotatably supporting said structure.

2. An electric welding apparatus comprising a transformer, welding electrodes connected to the secondary of said transformer, a reciprocating fluid pressure motor mounted on said transformer and connected to move said electrodes in and out of operative relation to work to be welded, a supporting carrier, and a rotatable mounting for said transformer and connected parts within said carrier.

3. An electric welding apparatus comprising a transformer, arms reciprocatable with respect to each other mechanically mounted on said transformer, and projecting away therefrom, electrodes mounted on said arms, electrical connections between said electrodes and the secondary winding of said transformer, a motor mounted on said transformer for moving said arms relatively to each other, a carrier and a movable mounting for said transformer and connected parts in said carrier.

4. An electric welding apparatus comprising a transformer, welding electrodes mounted on said transformer and connected to the secondary winding thereof, a motor mounted on said transformer for reciprocating at least one of said electrodes with respect to the other electrode, and a mounting permitting rotation of said electrodes about two axes at right angles to each other.

5. An electric welding apparatus comprising a source of welding current, welding electrodes connected thereto, a motor for moving said electrodes in and out of engagement, a common mount for said source, electrodes and motor, a carrier for rotatably supporting said mount and means for rotatably supporting said carrier.

6. An electric welding apparatus comprising a transformer, a bar fixedly attached to said transformer and extending outwardly from said transformer, a horn mounted on said bar remote from said transformer, a welding electrode located on said horn, a rod reciprocatable with respect to said transformer, a second welding electrode mounted on said bar adapted to coöperate with the first electrode, electric connections respectively between said electrodes and the secondary of said transformer, means for moving said reciprocating rod to engage work to be welded between said electrodes.

7. An electric welding apparatus comprising a transformer, an outwardly projecting frame attached to and extending through the core of said transformer, a welding electrode mounted on said frame remote from said transformer, a rod reciprocatable with respect to said transformer passing through said core, a welding electrode mounted on said bar coöperating with said fixed electrode, and a fluid-pressure motor mounted on said frame for reciprocating said rod.

8. An electric welding apparatus comprising a transformer, an outwardly projecting frame attached to and extending through the core of said transformer, a welding electrode mounted on said frame remote from said transformer, a reciprocating motor mounted on said frame, a rod attached to a movable member of said motor, a coöperating welding electrode mounted on said rod and movable thereby in and out of working relation with the electrode on said frame, electrical connections between said electrodes and a winding on said transformer, a carrier and a supporting member for said transformer rotatably mounted on said carrier.

9. An electric resistance welding apparatus comprising a transformer, a frame attached to and projecting away from said transformer, a welding electrode mounted on said frame remote from said transformer, a fluid-pressure motor mounted on said frame, a reciprocating welding electrode moved into coöperating relation with said first-mentioned electrode by said motor, electrical connections between said electrodes and a secondary winding of said transformer, a mounting for said parts permitting rotation thereof on an axis passing through said electrodes, transformer and motor and a support for said mounting permitting rotation on an axis at right angles to said first axis.

10. An electric welding machine comprising welding electrodes, a motor device for bringing said electrodes in and out of operating relation with work to be welded, a circuit for supplying welding current to said electrodes, and common means for controlling said motor device and completing said welding circuit.

11. An electric resistance welding machine comprising welding electrodes, a fluid pressure motor for causing said electrodes to engage with work to be welded, a circuit for supplying welding current to said electrodes, a valve for controlling said motor, an electric switch in said supply circuit, and common means for operating said valve and said switch in predetermined sequence.

In witness whereof, I have hereunto set my hand this 30th day of January, 1919.

WILBUR L. MERRILL